United States Patent
Sasabuchi et al.

(10) Patent No.: US 10,345,442 B2
(45) Date of Patent: Jul. 9, 2019

(54) COLLISION POSSIBILITY DETERMINATION DEVICE

(71) Applicant: HONDA MOTOR CO., LTD., Minato-Ku, Tokyo (JP)

(72) Inventors: Yoji Sasabuchi, Saitama (JP); Hiroaki Tani, Saitama (JP); Katsuya Mizutani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/313,725

(22) PCT Filed: Mar. 16, 2015

(86) PCT No.: PCT/JP2015/057748
§ 371 (c)(1),
(2) Date: Nov. 23, 2016

(87) PCT Pub. No.: WO2015/182221
PCT Pub. Date: Dec. 3, 2015

(65) Prior Publication Data
US 2017/0199274 A1    Jul. 13, 2017

(30) Foreign Application Priority Data
May 27, 2014   (JP) ................. 2014-108902

(51) Int. Cl.
*G01S 13/93*     (2006.01)
*G01S 13/86*     (2006.01)
(Continued)

(52) U.S. Cl.
CPC .......... *G01S 13/931* (2013.01); *G01S 13/867* (2013.01); *G06K 9/00805* (2013.01); *G08G 1/166* (2013.01); *G01S 2013/9367* (2013.01)

(58) Field of Classification Search
CPC ...................................... G01S 13/931
See application file for complete search history.

(56) References Cited

U.S. PATENT DOCUMENTS

| | | | |
|---|---|---|---|
| 2012/0035846 A1* | 2/2012 | Sakamoto | B60T 8/17558 701/301 |
| 2013/0251194 A1* | 9/2013 | Schamp | G06T 7/11 382/103 |
| 2015/0274162 A1* | 10/2015 | Sato | B60W 10/04 701/23 |

FOREIGN PATENT DOCUMENTS

| | | |
|---|---|---|
| CN | 101751703 | 6/2010 |
| JP | 2006-151114 A | 6/2006 |

(Continued)

OTHER PUBLICATIONS

Office Action dated Jul. 3, 2018 issued in the corresponding Chinese patent application No. 201580026732.0.

*Primary Examiner* — Imran K Mustafa
(74) *Attorney, Agent, or Firm* — Carrier Blackman & Associates, P.C.; Joseph P. Carrier; Jeffrey T. Gedeon

(57) ABSTRACT

A collision possibility determination device includes: a detection unit which detects at least one object which moves relatively with respect to a moving body; and a determination unit which determines a collision possibility of the moving body with the object. The determination unit defines a first factor and a second factor which are spaces between the body and the object in a travelling direction and in a width direction of the body respectively. The determination unit determines the possibility based on the two factors when the object is within a farther area from the body, and the possibility based on only the first factor when the object is within a nearer area from the body.

4 Claims, 8 Drawing Sheets

(51) Int. Cl.
*G06K 9/00* (2006.01)
*G08G 1/16* (2006.01)

(56) References Cited

FOREIGN PATENT DOCUMENTS

| | | |
|---|---|---|
| JP | 2010-079472 A | 4/2010 |
| JP | 2012-093883 A | 5/2012 |
| WO | 2013/118264 A1 | 8/2013 |

* cited by examiner

COLLISION POSSIBILITY DETERMINATION DEVICE

TECHNICAL FIELD

The present invention relates to a collision possibility determination device which determines a possibility that a moving body such as a vehicle will collide with an object which exists in the surroundings

BACKGROUND ART

A technique which detects an obstacle (for example, a pedestrian or a preceding vehicle) which exists in the surroundings of a vehicle and controls the vehicle so as to avoid colliding with the obstacle has been conventionally known.

Patent Literature 1 discloses a travelling control device provided with radar means that detects an obstacle in front of a concerned vehicle and imaging means that takes an image of an area in front of the concerned vehicle. When the travelling control device determines, from an image taken by the imaging means, that there is a possibility that a preceding vehicle exists on a lane on which the concerned vehicle is travelling, the radar means detects a reflected wave from the lane. When the reception intensity of the reflected wave is equal to or higher than a predetermined intensity, it is determined that the preceding vehicle exists.

The travelling control device determines a possibility that the concerned vehicle will collide with the preceding vehicle which exists on the lane on which the concerned vehicle is travelling. Accordingly, determination of a collision possibility is preferentially made for an obstacle which exists at a position closer to a center portion in the width direction of the concerned vehicle.

CITATION LIST

Patent Literature

Patent Literature 1: Japanese Patent Laid-Open No. 2010-079472

SUMMARY OF INVENTION

Technical Problem

In some cases, a collision possibility with an obstacle which exits in a center portion in the width direction of a concerned vehicle is higher than that with an obstacle which exists at a distance from the center portion in the width direction. For example, the concerned vehicle collides, with a higher possibility, with a vehicle which suddenly approaches from a side within a near distance from the concerned vehicle than with a vehicle which exists at a distant position on the lane on which the concerned vehicle is travelling.

However, a conventional travelling control device as disclosed in Patent Literature 1 preferentially determines a collision possibility with an obstacle which exists at a position closer to the center portion in the width direction of the concerned vehicle. Accordingly, even when an obstacle having a high collision possibility exists at a distance from the center portion in the width direction of the concerned vehicle, the collision possibility may be failed to be appropriately determined.

In view of the above circumstances, an object of the present invention is to provide a collision possibility determination device that appropriately determines a collision possibility of a moving body such as a vehicle with an object which exists in the surroundings.

Solution to Problem

A collision possibility determination device according to the present invention includes: a detection unit which detects at least one object which moves relatively with respect to a moving body; and a determination unit which determines a collision possibility of the moving body with the object based on a space between the moving body and the object in a travelling direction of the moving body and a space between the moving body and the object in a width direction of the moving body when the object exists in an area in which the space between the moving body and the object in the travelling direction of the moving body is equal to or larger than a predetermined value, and which determines the collision possibility of the moving body with the object based on the space between the moving body and the object in the travelling direction of the moving body when the object exists in an area in which the space between the moving body and the object in the travelling direction of the moving body is smaller than the predetermined value.

According to the present invention, the determination unit determines the collision possibility of the moving body with the object based on the space between the moving body and the object in the travelling direction of the moving body and the space between the moving body and the object in the width direction of the moving body when the object is detected in the area in which the space between the moving body and the object in the travelling direction of the moving body is equal to or larger than the predetermined value, while the determination unit determines the collision possibility of the moving body with the object based on the space between the moving body and the object in the travelling direction of the moving body when the object is detected in the area in which the space between the moving body and the object in the travelling direction of the moving body is smaller than the predetermined value.

That is, when the object is detected at a shorter distance in the travelling direction of the moving body, the collision possibility of the moving body with the object is determined regardless of the space between the moving body and the object in the width direction of the moving body. Accordingly, it is more highly likely to be determined that the moving body has a collision risk with the object which exists at a shorter distance from the moving body, so that the collision possibility can be determined appropriately.

In the present invention, the space may be expressed by a distance from the moving body to the object or a time required for the moving body to reach the object.

In determination made by the determination unit, an area which is independent from the space between the moving body and the object in the width direction of the moving body, increases or decreases based on the speed of the moving body. Thus, the predetermined value which is used for determining the collision possibility of the moving body with the object is adjusted based on the moving speed of the moving body. This makes determination of the collision possibility more appropriate.

Further, it is preferable that the detection unit detects a plurality of the objects, and that the determination unit preferentially determines the collision possibility with the object which exists in the area in which the space between the moving body and the object in the travelling direction of the moving body is smaller than the predetermined value and which moves relatively toward the moving body, of the plurality of detected objects.

In general, the collision possibility of the moving body becomes higher with the object which exists at a shorter distance from the moving body and which moves relatively toward the moving body. Therefore, if the collision possibility with such an object is determined preferentially, the collision possibility can be determined more appropriately.

DESCRIPTION OF EMBODIMENTS

Hereinafter, descriptions will be given in detail of embodiments of the present invention with reference to the drawings.

First Embodiment

Figure 1:
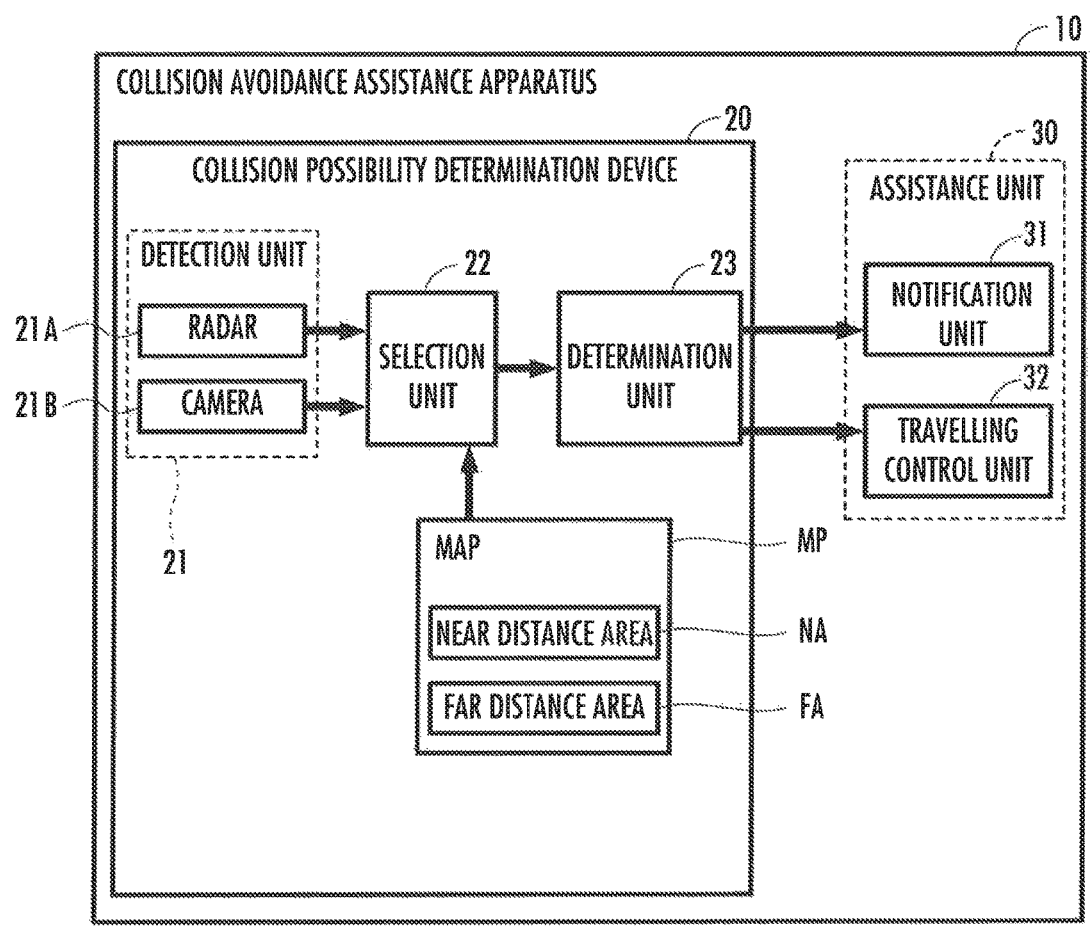
FIG. 1 is a diagram illustrating a configuration of a collision possibility determination device according to a first embodiment.

FIG. 1 is a block diagram illustrating a configuration of a collision avoidance assistance apparatus (hereinafter, referred to as an "assistance apparatus 10") including a collision possibility determination device (hereinafter, referred to as a "determination device 20") of the present embodiment.

The determination device 20 includes a detection unit 21 that detects a moving body and at least one object moving relatively with respect to the moving body, a selection unit 22 that selects an object (hereinafter, referred to as a "determination target object") as a determination target for the determination device 20 from among at least the one detected object, and a determination unit 23 that determines a collision possibility of the moving body with the object. In the determination device 20, a map MP to which reference is made when the selection unit 22 selects the determination target object is stored.

In the present embodiment, a case where the moving body is a vehicle and the object is a pedestrian will be described below as an example. As an example, a case where the determination device 20 (assistance apparatus 10) is provided in the vehicle (installed in the vehicle) will be described. For example, the moving body may be a vehicle such as an automobile and a motorcycle, or a portable terminal such as a smartphone and a tablet terminal. The object is an obstacle which may exist or appear in the front of the vehicle such as an automobile or a pedestrian which/who moves relatively with respect to the moving body, or a guardrail, or an electric pole.

The detection unit 21 includes a radar device (hereinafter, simply referred to as a "radar 21A") such as an electromagnetic radar, for example, and an imaging device (hereinafter, simply referred to as a "camera 21B") such as a CCD camera, for example. The detection unit 21 detects an object which exists on a travelling course (for example, a road) of the vehicle and sends the detection result (for example, a detection signal or an image) to the selection unit 22.

In the present embodiment, a case where the detection unit 21 includes the radar 21A and the camera 21B will be described. However, the detection unit 21 may be configured by any one of the radar 21A and the camera 21B, for example.

The assistance apparatus 10 has an assistance unit 30 that assists the vehicle to avoid colliding with the object based on a determination result made by the determination device 20. The assistance unit 30 includes a notification unit 31 that gives a notification of the determination result made by the determination unit 23 of the determination device 20 and a travelling control unit 32 that controls travelling of the vehicle based on the determination result made by the determination unit 23.

Figure 2:
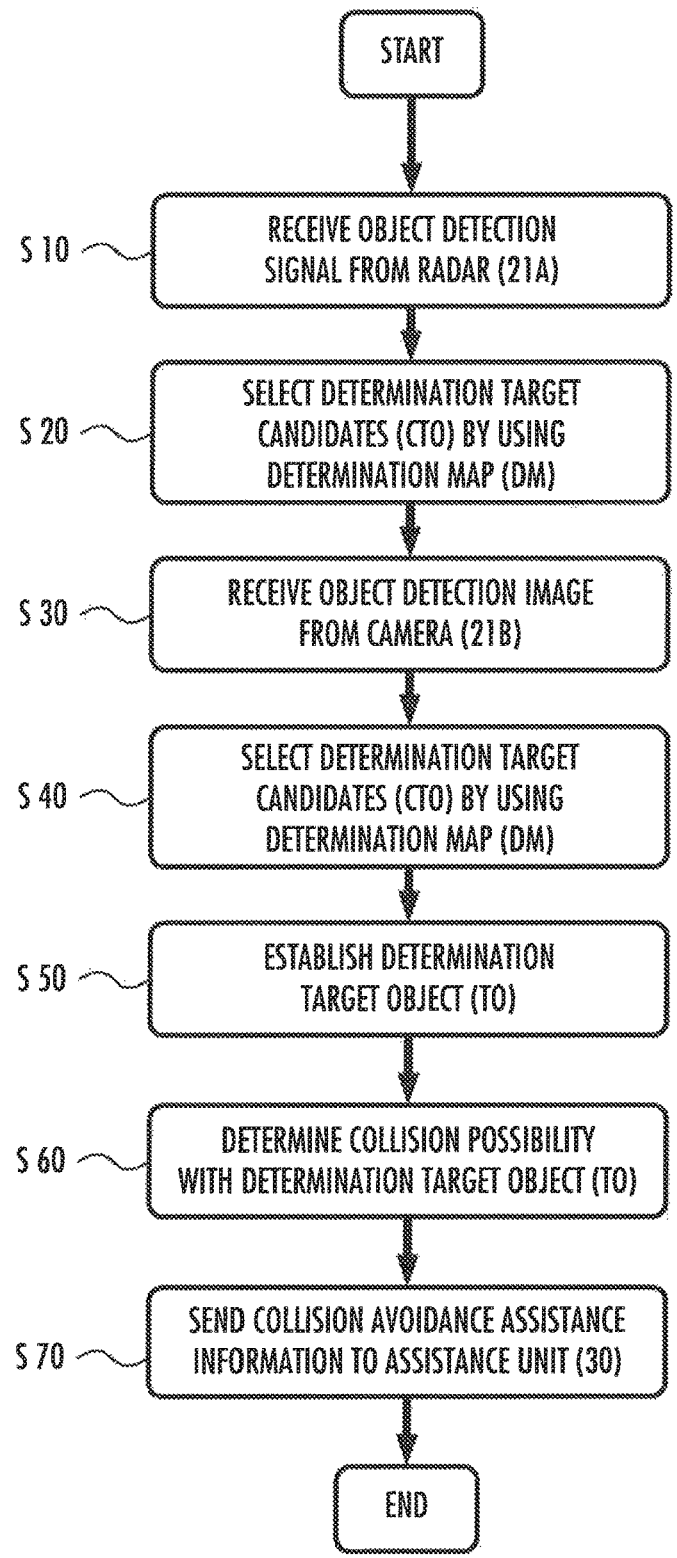
FIG. 2 shows an operation flow of the collision possibility determination device in FIG. 1.

With reference to FIG. 2, an operation procedure of the determination device 20 will be described. Steps S10 to S50 are performed by the selection unit 22.

For the objects which exist in an area in which a space (a distance or a reach time) from the vehicle in the traveling direction of the vehicle which is the moving body is equal to or larger than a predetermined value, the selection unit 22 selects the determination target object therefrom on the basis of this space and a space from the vehicle in the width direction of the vehicle. For the objects which exist in an area in which the space from the vehicle in the traveling direction of the vehicle is smaller than the predetermined value, the selection unit 22 selects the determination target object therefrom on the basis of this space.

More detailed descriptions of the object selection steps (steps S10 to S50) of the selection unit 22 will be given. First, at step S10, the selection unit 22 receives an object detection signal from the radar 21A. More specifically, the radar 21A detects the object and sends the object detection signal to the selection unit 22. The selection unit 22 receives the object detection signal from the radar 21A.

Next, at step S20, the position of the object detected by the radar 21A is collated with the map MP, and a determination target candidate CTO is selected.

Specifically, the selection unit 22 detects (calculates) a relative position on the basis of the object detection signal from the radar 21A, using the object vehicle as a reference, and maps the position of the object on the map MP. More specifically, the selection unit 22 acquires object positional information on the basis of the reception intensity of an electromagnetic reflected wave of the object from the radar 21A, and maps the position information on the map MP. The selection unit 22 selects the determination target candidate CTO from among the objects on the basis of the mapped object positions.

Figure 3:
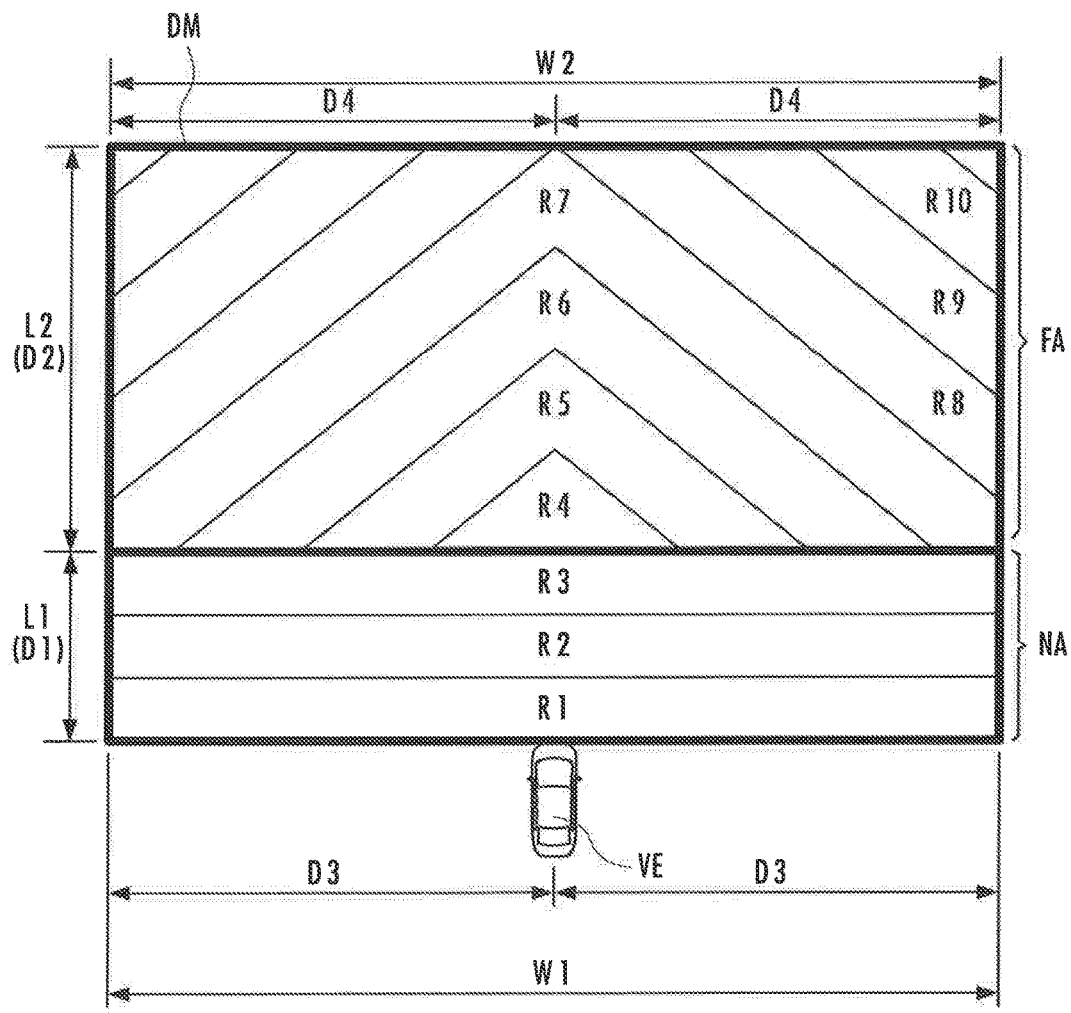
FIG. 3 is a diagram illustrating a configuration of a map to which reference is made when the collision possibility determination device in FIG. 1 selects an object as a determination target.

FIG. 3 is a diagram illustrating details of the map MP. In the present embodiment, a case where the map MP has a rectangular shape as a whole will be described.

A near distance area NA on the map MP has a near distance map length L1 which is, in the travelling direction of a vehicle VE, a distance (first distance) D1 from the vehicle VE and a near distance map width W1 in the width direction of the vehicle VE. A far distance area FA has a far distance map length L2 which is, in the travelling direction of the vehicle VE, a distance (second distance) D2 from the near distance area NA and a far distance map width W2 in the width direction of the vehicle VE.

The lengths of the near and far distance map widths W1 and W2 are distances D3 and D4, respectively, from the center portion in the width direction of the vehicle VE. That is, the magnitudes of the near and far distance map widths W1 and W2 correspond to lengths from the center of the vehicle VE to left and right by the distances D3 and D4, respectively. In the present embodiment, a case where the first and second widths W1 and W2 are equal to each other, that is, where the near distance area NA and the far distance area FA each have the identical map width will be described.

As illustrated in FIG. 3, each of the near distance area NA and the far distance area FA on the map MP is divided into a plurality of small regions. For example, the near distance area NA is divided into three small regions R1 to R3, and the far distance area FA is divided into seven small regions R4 to R10. The selection unit 22 determines the collision possibility on the basis of in which small region the object exists, actually.

For example, the small regions R1 to R10 are formed such that the regions are ranked in the descending order of the collision possibility of the object with the vehicle VE. For example, the object in the small region R2 has a higher possibility of collision with the vehicle VE than the object in the small region R4.

In the near distance area NA, the collision possibility of the vehicle VE with the object is set on the basis of the distance in the travelling direction of the vehicle. Therefore, as illustrated in FIG. 3, the small regions R1 to R3 in the near distance area NA are defined or set without considering the distance in the width direction of the vehicle VE.

On the other hand, in the far distance area FA, the collision possibility of the object with the vehicle VE is set by considering both of the distances in the travelling direction and the width direction of the vehicle VE. Therefore, as illustrated in FIG. 3, the small regions R4 to R10 in the far distance area FA each have a mountain shape (V shape) the center of which is at the center portion in the width direction of the vehicle VE.

More specifically, in the near distance area NA, as the object exists at a longer distance from the vehicle VE in the travelling direction of the vehicle VE (as the object is moved from the small region R1 to R3), the collision possibility of the object with the vehicle VE decreases.

However, even when the object moves away from the vehicle VE along the width direction of the vehicle VE, the collision possibility of the object with the vehicle VE does not change. On the other hand, in the far distance area FA, in both of a case where the object moves away from the vehicle VE along the travelling direction of the vehicle VE and a case where the object moves away from the vehicle VE along the width direction of the vehicle VE, the collision possibility of the object with the vehicle VE decreases.

The boundary between the near distance area NA and the far distance area FA, that is, a distance L1 can be adjusted on the basis of a moving speed of the vehicle VE. More specifically, the distance L1 is set relatively longer (the boundary is set at a distant position) when the vehicle VE moves at a high speed, and the distance L1 is set shorter (the boundary is set at a near position) when the vehicle VE moves at a slow speed. Accordingly, a criterion for selecting the determination target object TO can be changed on a highway, in a city, or the like, for example.

Figure 4:
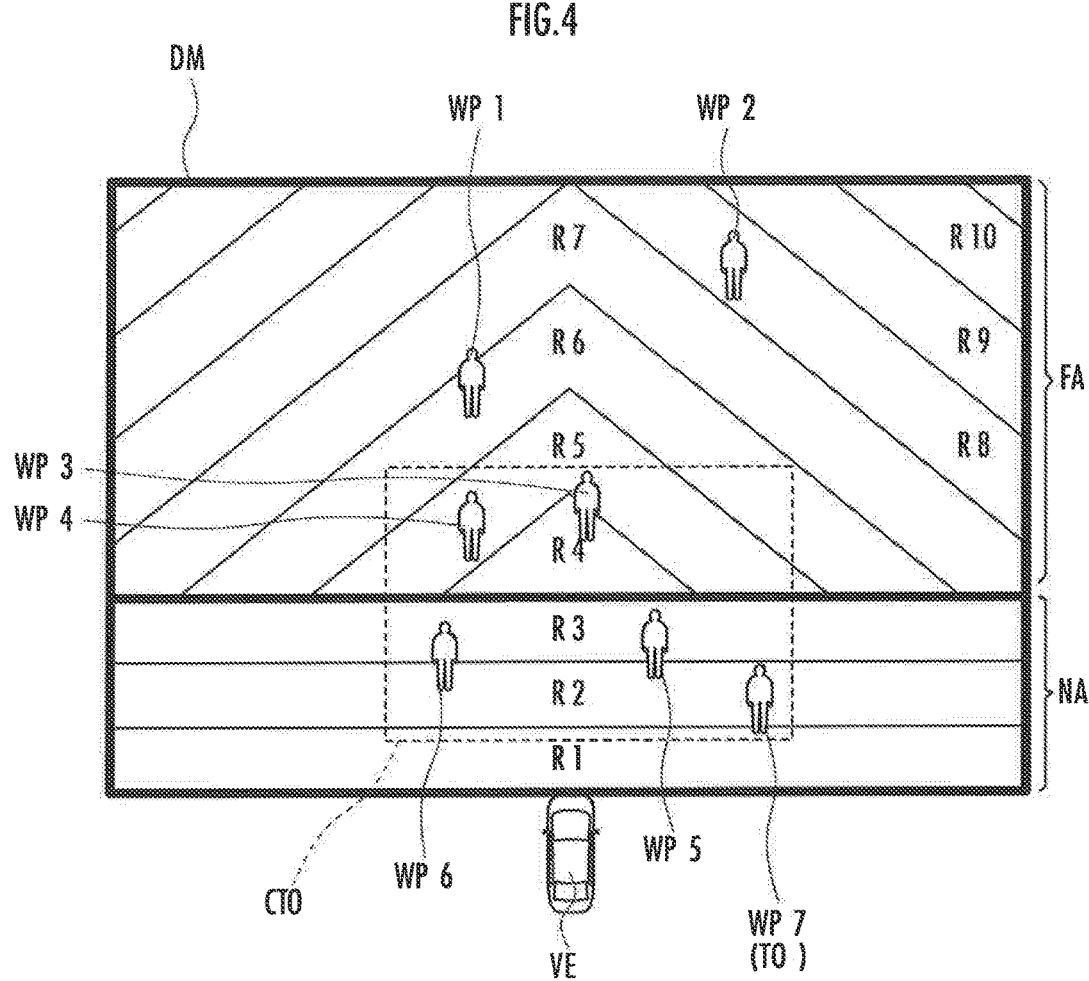
FIG. 4 is a diagram illustrating a plurality of detected objects, selected determination target candidates, and a determination target object, in the collision possibility determination device in FIG. 1.

FIG. 4 is a diagram illustrating the determination target object TO and a plurality of the objects having been detected and mapped. FIG. 4 illustrates a case where seven pedestrians (seven objects) constituted of pedestrians WP1 to WP7 are detected. An example of the criterion for the selection unit 22 to select the determination target object TO at the object selection step (step S20) will be described below with reference to FIG. 4.

For example, the selection unit 22 scans the map MP sequentially from the small region R1, and extracts a predetermined number of the determination target candidates CTO from the mapped objects. For example, as illustrated in FIG. 4, the selection unit 22 extracts (selects), as the determination target candidates CTO, five pedestrians WP3 to WP7 having higher collision possibilities from among the pedestrians WP1 to WP7.

Next, at step S30, the selection unit 22 receives an object detection signal (image) from the camera 21B. More specifically, the camera 21B detects the objects and sends a detection image of the objects to the selection unit 22. The selection unit 22 receives the detection signal of the objects from the camera 21B.

Next, at step S40, the selection unit 22 collates the positions of the objects detected by the camera 21B with the map MP, and selects the determination target candidates CTO. More specifically, for example, the selection unit 22 maps the positions of the objects on the map MP on the basis of the object detection image from the camera 21B. For example, the selection unit 22 acquires images taken by the camera 21B, generates edged images from illuminance change points or the like, acquires position information of the objects from the edged images, and maps the position information.

Next, the selection unit 22 extracts the determination target candidates CTO from among the detected objects. Step S40 is performed similarly to step S20. In the present embodiment, a case where the same determination target candidates CTO are selected at steps S20 and 40 will be described.

Next, at step S50, the selection unit 22 performs matching among the determination target candidates CTO based on the detection result from the radar 21A and the determination target candidates CTO based on the detection result from the camera 21B. More specifically, for example, what the objects are or the positions of the objects are compared (collated) using the object information from the both types of the candidates. Thus, the determination target TO is established from among the determination target candidates CTO. In addition, the position of the determination target object TO is established.

For example, when the object information is not matched between the both types, the object is excluded from the determination target. For example, when the object has positional information of the object information significantly different from the other positional information, the selection unit 22 excludes the object at different positions from the determination target candidates CTO.

In this way, the selection unit 22 selects the determination target object TO from among the objects detected by the detection unit 21. In the present embodiment, one determination target object (pedestrian WP7) is selected.

As described above, for the object at a predetermined distance D1 or more from the moving body (vehicle VE) in the travelling direction of the vehicle VE, the selection unit 22 of the determination device 20 selects the determination target object TO on the basis of a distance from the vehicle VE to the object in the travelling direction of the vehicle VE, and a distance from the vehicle VE to the object in the width direction of the vehicle VE.

For the object at a distance which is less than the predetermined distance D1 from the vehicle VE in the travelling direction of the vehicle VE, the selection unit 22 selects the determination target object TO on the basis of the distance from the vehicle VE to the object in the travelling direction of the vehicle VE. Therefore, the object having the highest collision possibility can be reliably selected from among the detected objects.

As the space to the object which is used for selection of the object, a time required for the vehicle VE to reach the object in the travelling direction of the vehicle VE, that is, a time to collision (TTC) in the travelling direction of the vehicle VE may be considered instead of the distance in the travelling direction of the vehicle VE by the selection unit 22.

In this case, the distance (distance D1 in FIG. 3, etc.) from the vehicle VE to the object in the travelling direction of the vehicle VE, which is a selection condition to the selection unit 22, is the length of the time to collision (for example, T1=(distance D1)/(vehicle travelling direction component of a relative speed of the vehicle with respect to the object)).

More specifically, from among the objects at positions which the times required for the vehicle VE to reach in the travelling direction of the vehicle VE are equal to or more than the predetermined time (T1), the selection unit 22 selects the determination target object TO on the basis of the times required for the vehicle VE to reach the objects and the distances from the vehicle VE to the objects in the width direction of the vehicle VE.

On the other hand, from among the objects at positions which the times required for the vehicle VE to reach in the travelling direction of the vehicle VE are less than the predetermined time (T1), the selection unit 22 selects the determination target object TO on the basis of the times required for the vehicle VE to reach the objects. The selection unit 22 may select the determination target object TO in this way.

The selection unit 22 may consider moving speeds (that is, relative speeds) of the detected objects to select the determination target object TO. More specifically, the selection unit 22 may select the determination target object TO on the basis of not only the relative positions of the objects but also the relative speeds (moving speeds) of the objects.

Figure 5:
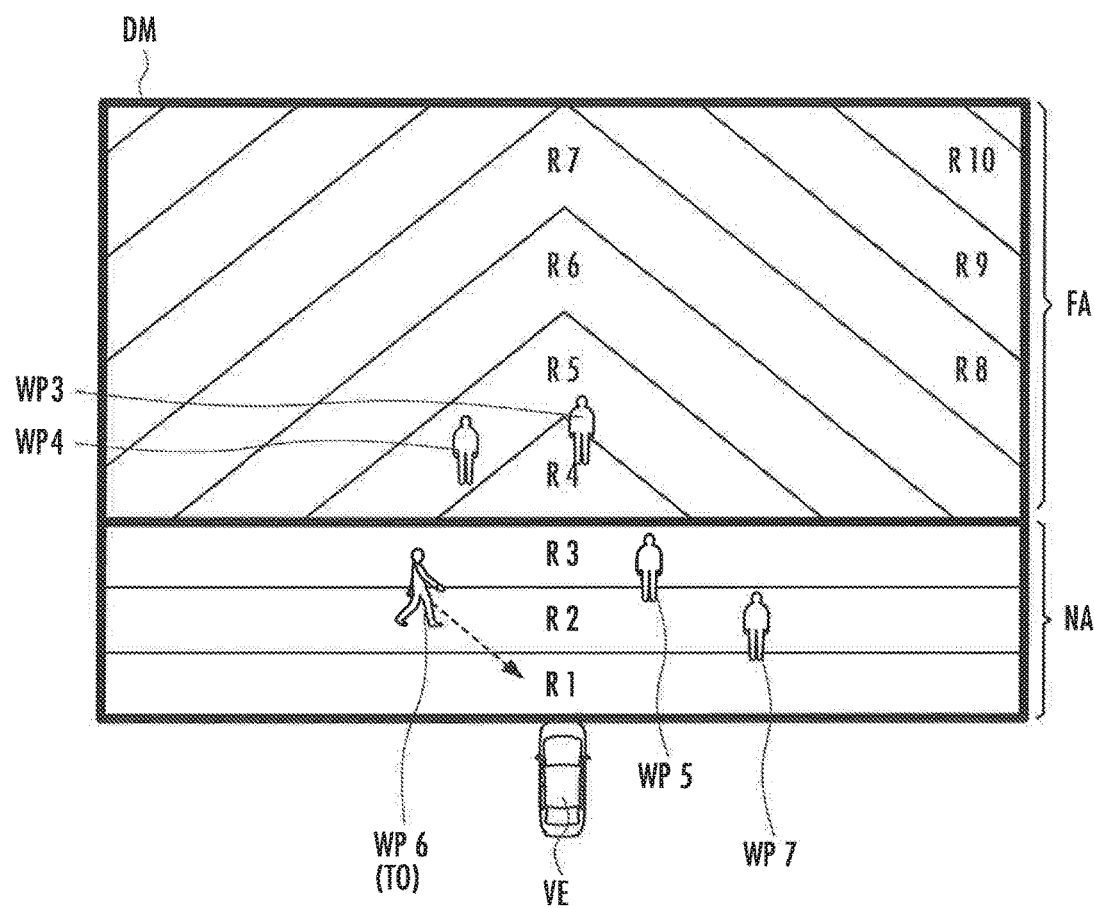
FIG. 5 is a diagram illustrating another example of a plurality of detected objects and a selected determination target object, in the collision possibility determination device in FIG. 1.

With reference to FIG. 5, descriptions will be given of the criterion for the selection unit 22 to select the determination target object TO in a case where a moving direction is considered. FIG. 5 illustrates a case where the pedestrian WP6 of the determination target candidates CTO moves (walks) toward the vehicle VE. A broken-line arrow in FIG. 5 shows the moving direction of the pedestrian WP6.

First, the selection unit 22 determines, as the determination target object TO, the pedestrian WP7 of the objects (pedestrians), which exists across the small regions R1 and R2 each having the highest collision possibility. However, the pedestrian WP6 is walking (moving) toward the vehicle VE. In this case, the selection unit 22 determines the pedestrian WP6 as the determination target object.

That is, the selection unit 22 preferentially selects, as the determination target object TO, the pedestrian WP6 who is moving toward the vehicle VE in the near distance area NA. In other words, the selection unit 22 preferentially determines, as the determination target object TO, the object which exists at a distance less than the predetermined distance L1 from the vehicle VE in the travelling direction of the vehicle VE and which is moving relatively toward the vehicle VE, of the plurality of detected objects.

When the determination target object TO is selected on the basis of the time to collision, the selection unit 22 preferentially selects, as the determination target object TO, the object which exists at a position which the time required for the vehicle VE to reach is less than the predetermined time T1 and which is moving relatively toward the vehicle VE.

When the detection unit 21 includes only one of the radar 21A and the camera 21B, or when the detection unit 21 uses only one of the radar 21A and the camera 21B to detect the objects, the corresponding selection steps are omitted. For example, when the detection unit 21 includes only the radar 21A, steps S30, S40, and S50 are omitted. That is, at step S20, the determination target object TO is selected and established.

Next, at step S60, the determination unit 23 determines the collision possibility of the determination target object TO with the vehicle VE. More specifically, the determination unit 23 determines the collision possibility (risk) of the determination target object TO with the vehicle VE considering the positions, sizes, moving directions, moving speeds, or the like of the vehicle VE and the determination target object TO, for example.

Next, at step S70, assisting the vehicle to avoid collision with the object is performed on the basis of the determination result made by the determination unit 23 of the determination device 20. More specifically, the determination unit 23 sends collision avoidance assistance information to the assistance unit 30 on the basis of the determination result. The notification unit 31 or the travelling control unit 32 of the assistance unit 30 having received the information notifies the information about the collision risk or a collision avoiding method, etc., for example, to the vehicle (a user). In this way, the assistance apparatus 10 performs assistance to avoid collision of the vehicle with the object More specifically, the notification unit 31 notifies the driver of the vehicle of the collision possibility (risk) with the object through a voice, a lamp, a character display, or the like using a speaker, a lamp, or a display part (not illustrated), for example. The notification unit 31 may guide the vehicle to avoid the collision with the object The assistance unit 30 has the travelling control unit 32 that controls travelling of the vehicle on the basis of the determination result made by the determination unit 23. For example, the travelling control unit 32 controls travelling of the vehicle to avoid collision with the determination target object by cooperating with a braking mechanism or a steering mechanism (not illustrated) of the vehicle.

The notification unit 31 allows a user riding on the moving body such as the vehicle or a user operating the portable terminal, for example, to recognize existence of the object having the high collision possibility in the travelling direction. The travelling control unit 32 can control travelling (for example, a braking operation or a handling operation) of the vehicle, for example. Accordingly, for example, even when a time to consider avoiding collision with the object before actual collision is little (that is, in an emergency), the collision can be avoided.

As described above, in the present embodiment, when selecting the determination target object TO, the selection unit 22 sets regions for which the distance in the width direction of the vehicle is not considered, and considers only the traveling direction for the regions. Accordingly, for example, even when a pedestrian who exists at a position near the vehicle suddenly runs out from a side, the pedestrian can be reliably set as the determination target for the collision possibility.

Various parameters are considered in determination of the collision possibility. Thus, a considerable time is required to simultaneously determine the collision possibilities with a plurality of objects. However, in the present embodiment, a calculation time can be focused on only the object having a high risk of collision so that load on the device to determine the collision possibility can be reduced.

Second Embodiment

Figure 6:
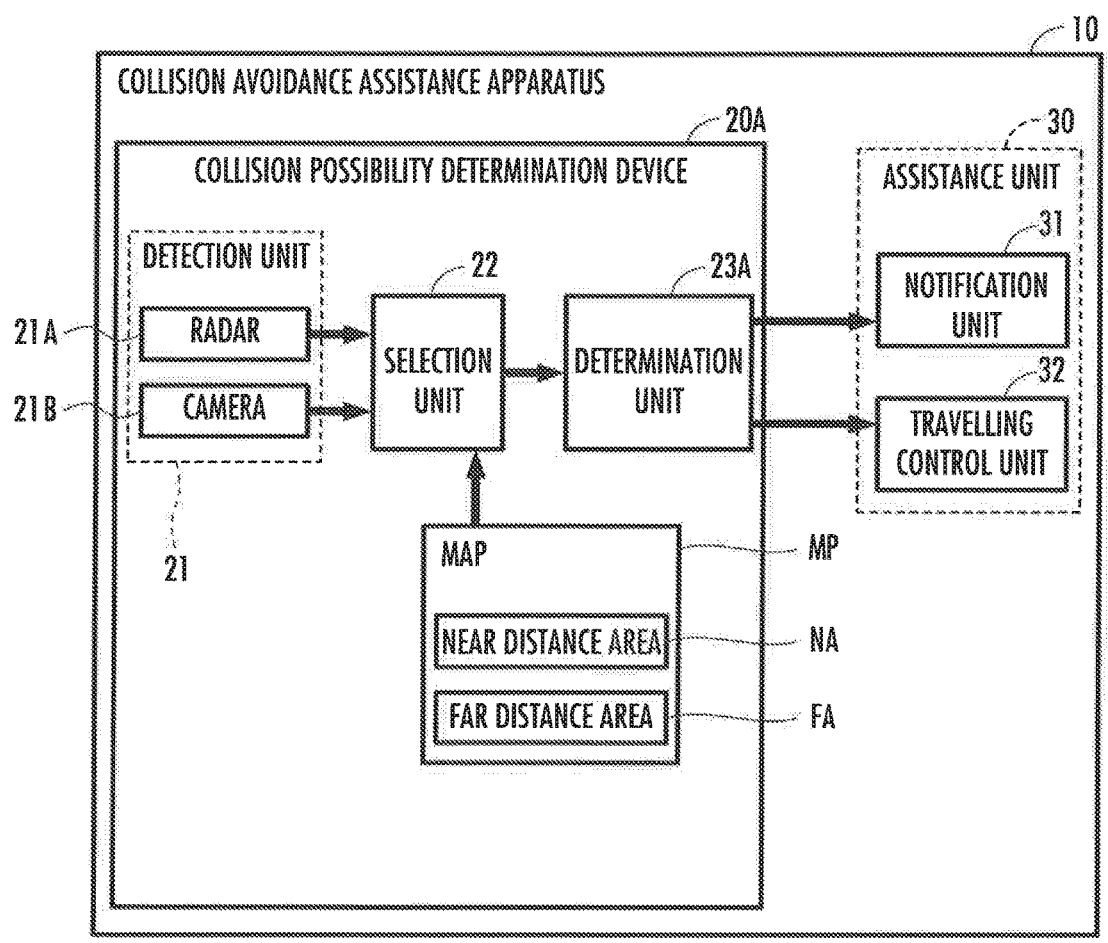
FIG. 6 is a diagram illustrating a configuration of a collision possibility determination device according to a second embodiment.

FIG. 6 is a block diagram illustrating a configuration of a collision possibility determination device 20A according to the second embodiment. The collision possibility determination device 20A has an operation flow similar to that the determination device 20 has in the first embodiment except that a determination unit 23A uses the map MP. That is, in the second embodiment, the determination unit 23A also uses the map MP in determining the collision possibility of the vehicle with the object. Operations of the determination unit 23A will be described below.

Figure 7:
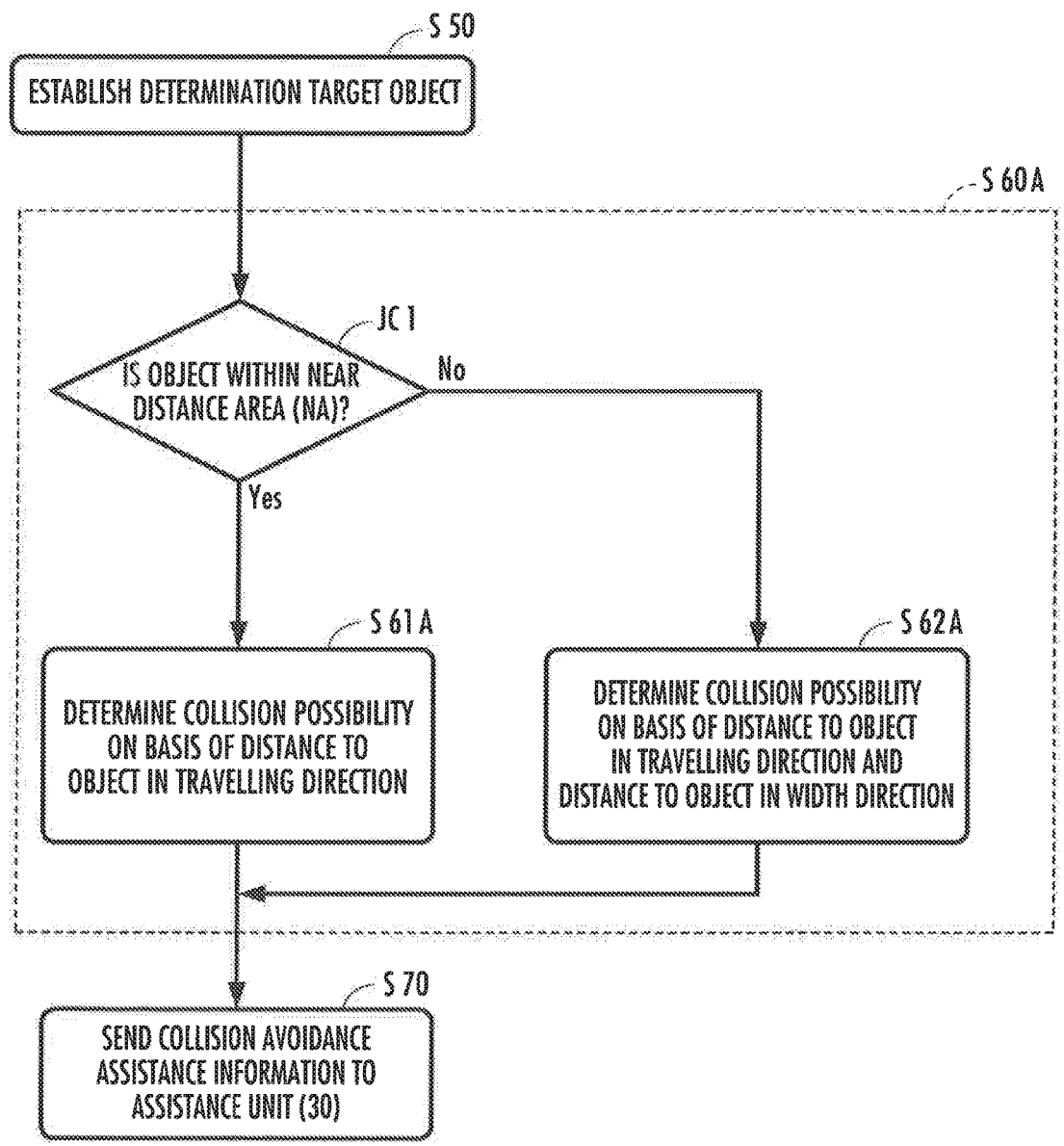
FIG. 7 is a diagram illustrating an operation procedure of a determination unit in the collision possibility determination device in FIG. 6.

FIG. 7 is a diagram illustrating a detailed flow of a determination step (step S60A) to be performed by the determination unit 23A. First, before determining the collision possibility, the determination unit 23A performs conditional branching (JC1) on the basis of the position, on the map MP, of the detected object or selected object. More specifically, the conditional branching is performed on the basis of whether or not the object exists in the near distance area NA.

Next, when the object is positioned in the near distance area NA ("Yes" in the conditional branching JC1), the determination unit 23A determines the collision possibility of the vehicle with the object on the basis of the distance from the vehicle to the object in the travelling direction of the vehicle (step S61A). On the other hand, when the object is positioned in the far distance area FA ("No" in the conditional branching JC1), the determination unit 23A determines the collision possibility on the basis of the distance from the vehicle to the object in the travelling direction of the vehicle and the distance from the vehicle to the object in the width direction of the vehicle (step S62A).

In other words, of the detected objects, for the object which exists at a predetermined distance (the near distance map length L1 in FIG. 3, that is, the distance D1) or more from the vehicle in the travelling direction of the vehicle, the determination unit 23A determines the collision possibility of the vehicle with the object on the basis of the distance from the vehicle to the object in the travelling direction of the vehicle and the distance from the vehicle to the object in the width direction of the vehicle.

On the other hand, for the object which exists at a distance which is less than the predetermined distance (D1) from the vehicle in the travelling direction of the vehicle, the determination unit 23A determines the collision possibility of the vehicle with the object on the basis of the distance from the vehicle to the object in the travelling direction of the vehicle.

When determining the collision possibility, the determination unit 23A may consider a time required for the vehicle VE to reach the object in the travelling direction of the vehicle VE, that is, a time to collision (TTC) in the travelling direction of the vehicle VE, instead of the distance in the travelling direction of the vehicle VE.

In this case, the distance (the distance D1 in FIG. 3, etc.) from the vehicle VE to the object in the travelling direction of the vehicle VE, which is the determination condition for the determination unit 23A, is the length of the time to collision (for example, T2=distance D1/vehicle travelling direction component of the relative speed of the vehicle with respect to the object).

Figure 8:
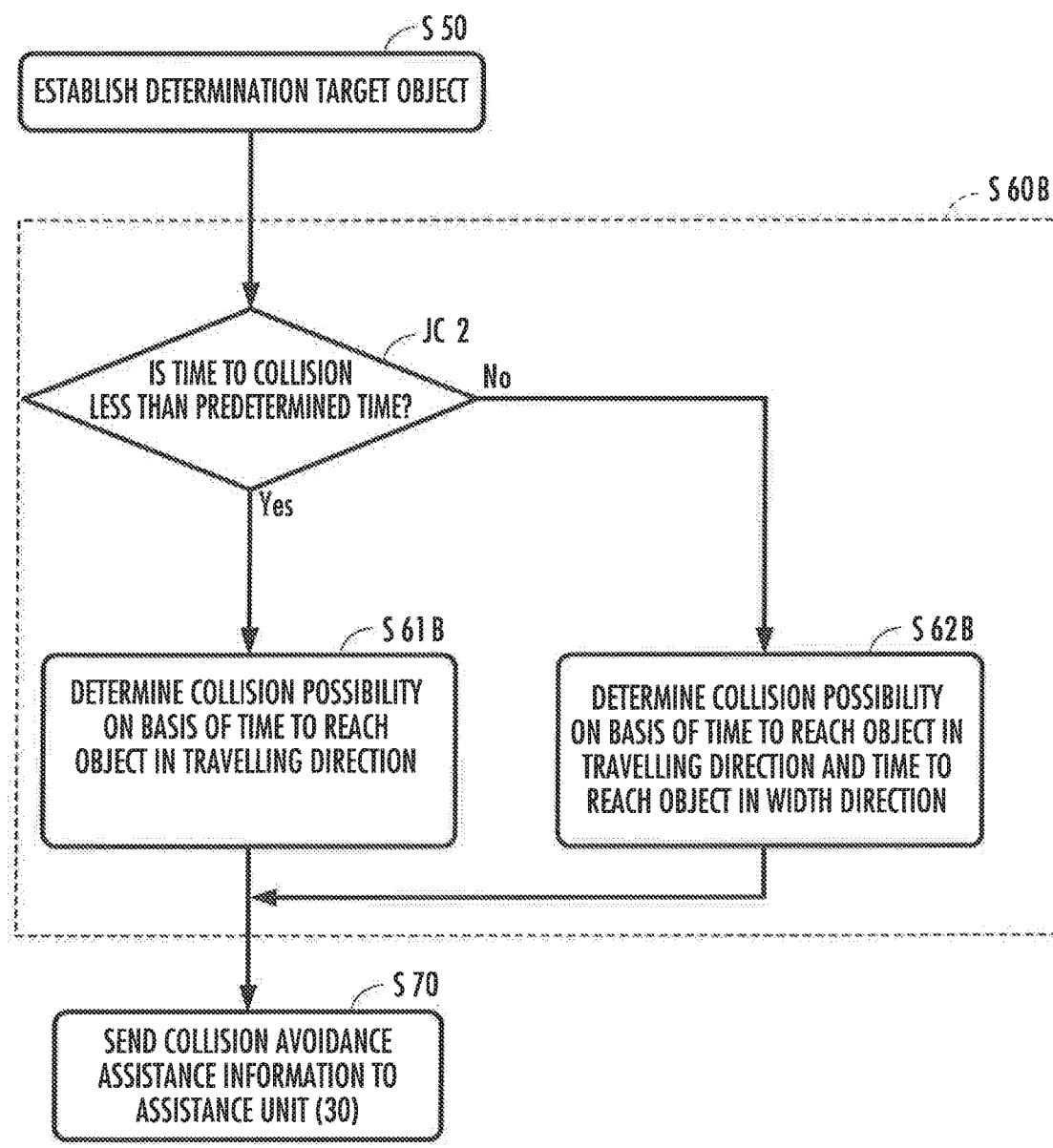
FIG. 8 is a diagram illustrating another operation procedure of the determination unit in the collision possibility determination device in FIG. 6.

More specifically, the determination unit 23A may perform conditional branching (conditional branching JC2) on the basis of a time required for the object to reach the vehicle in the travelling direction of the vehicle, as in step S60B shown in FIG. 8, to determine the collision possibility on the basis of the conditional branching.

First, for the object which exists at a position which the time for the vehicle to reach in the travelling direction of the vehicle is less than the predetermined time (T2) ("Yes" in the conditional branching JC2), the determination unit 23A determines the collision possibility of the vehicle with the object on the basis of the time required for the vehicle to reach the object in the travelling direction of the vehicle (step S61B).

On the other hand, for the object which exists at a position which the time required for the vehicle to reach in the travelling direction of the vehicle is the predetermined time (T2) or more ("No" in the conditional branching JC2), the determination unit 23A determines the collision possibility of the vehicle with the object on the basis of the time required for the vehicle to reach the object in the travelling direction of the vehicle and the time required for the vehicle to reach the object in the width direction of the vehicle (step S62B).

In this manner, the determination unit 23A can determine the collision possibility of the moving body with the object through step S60A in FIG. 7 or step S60B in FIG. 8.

As described above, in the present embodiment, the collision possibility can be appropriately determined for the object, etc. which suddenly runs out in the front of the moving body within the near distance of the moving body, for example. In addition, even when a plurality of objects are detected, the object which suddenly runs out within the near distance, for example, can be reliably determined as the object having the high collision possibility.

In the present embodiment, the map MP is used for both selection of the objects made by the selection unit 22 and determination of the collision possibility made by the determination unit 23A. However, the map MP may be used for only determination of the collision possibility made by the determination unit 23A.

Within the near distance, the determination unit 23A determines the collision possibility with the object by considering only the distance in the travelling direction of the vehicle or the time to collision in the travelling direction of the vehicle. This enables accurate calculation of the collision possibility. Therefore, when the object suddenly approaches the vehicle from a side of the vehicle, determination of the collision possibility and a collision avoidance action based thereon can be reliably performed.

In the above embodiment, the case where the plurality of objects are detected has been described. However, when only one object is detected, the collision possibility for the one object may be directly determined by the determination unit without performing the selection step to be made by the selection unit 22.

In addition, the case where only one determination target object is selected has been described. However, a plurality of determination target objects may be selected. For example, two determination target objects may be selected such that the determination unit determines the collision possibility for each determination target object. The determination unit may determine the collision possibility for a part of the determination target objects by using the map MP.

When the time to collision in the travelling direction of the moving body is used in selection of the determination target object and in determination of the collision possibility, the time to collision may be also considered for the distance in the width direction of the moving body. That is, for the objects which exist at positions each having the time to collision in the travelling direction of the moving body equal to or longer than a predetermined time, selection of the determination target object and determination of the collision possibility may be performed on the basis of the time to collision in the travelling direction and the time to collision in the width direction.

Further, the area may be divided into regions also in the width direction of the moving body (vehicle) to determine the collision possibility (risk level). For example, when a stationary object is detected in a region having a predetermined space or less, in the width direction (the lateral direction with respect to the travelling direction) of the vehicle including a front travelling course of a travelling vehicle (concerned vehicle), the stationary object is determined to have the lower collision possibility than the moving body in the travelling direction. When the object is detected in a region outside the above region, the object is determined to have the low collision possibility (risk level) as long as (1) the movement distance (lateral movement amount) of the concerned vehicle in the width direction is not more than a predetermined value, (2) a predetermine period of time has not elapsed since a steering operation, and (3) the moving speed (lateral movement speed) of the concerned vehicle in the width direction is not more than a predetermined value. Alternatively, when not all but any one or two of the conditions (1) to (3) are satisfied, the object may be determined to have the low collision possibility.

The embodiments illustrated in the drawings have been described above. However, the present invention is not limited thereto.

In the above embodiments, the case where the detection unit detects the objects has been described. However, detection of the objects and the relative positions of the objects to the moving body are not limited to those performed by the detection unit. For example, the assistance apparatus may receive positional information of the moving body and the objects through the GPS (global positioning system), etc.

The collision possibility determination device may be provided separately from the moving body (the vehicle or the portable terminal) In this case, the collision possibility, with the object, of the moving body (for example, the vehicle or the portable terminal) separated from the collision possibility determination device may be determined such that the determination result is sent to the moving body. When the collision possibility determination device has this configuration, the collision possibility determination device may be fixed to an electric pole at an intersection, etc., for example. Accordingly, determination of the collision possibility and assistance to avoid collision can be performed for a plurality of moving bodies entering the intersection.

In the above embodiments, the case where the assistance unit 30 is provided separately from the determination device 20 has been described. However, the assistance unit 30 may be provided in the determination device 20, for example. In addition, in the above embodiments, the case where the determination device 20 is provided in the assistance apparatus 10 has been described. However, the collision possibility determination device may be provided separately from the collision avoidance assistance apparatus.

The invention claimed is:

1. A collision possibility determination device characterized by comprising:
   a map identifying predefined areas surrounding the moving body including a predefined near distance area and a predefined far distance area, the predefined near distance area having a near distance length in the traveling direction of the moving body and a near distance width in the width direction of the moving body, and the predefined far distance area having a far distance length that is farther than the near distance length in the traveling direction of the moving body and a far distance width that is farther than the near distance width in the width direction of the moving body;
   a selection unit which identifies and groups, based on the map, the at least one object into near distance objects in the predefined near distance area or far distance objects in the predefined far distance area, and wherein the selection unit further selects at least one target object as a determination target from among the at least one object; and
   a determination unit which determines a collision possibility of the moving body with the target object in a far distance mode for far distance objects on the basis of a space between the moving body and the target object in a travelling direction of the moving body and a space between the moving body and the target object in a width direction of the moving body, and determines the collision possibility of the moving body with the target object in a near distance mode for near distance objects on the basis of the space between the moving body and the target object in a travelling direction of the moving body
   and which determines that the collision possibility of the moving body increases for a target object as the distance from the moving body in the travelling direction of the moving body decreases when the target objects exist in the near distance area,
   wherein the space is a distance from the moving body to the target object or corresponds to a time for the moving body to reach the target object.

2. The collision possibility determination device according to claim 1, characterized in that the near distance length is adjusted based on a moving speed of the moving body.

3. The collision possibility determination device according to claim 1, characterized in that
   the detection unit detects a plurality of objects, and
   the determination unit determines the collision possibility preferentially for the target object which exists at a position having a distance which is less than the near distance length in the travelling direction of the moving body and which moves relatively toward the moving body, of the plurality of objects.

4. The collision possibility determination device according to claim 1,
   wherein the predefined near distance area and the predefined far distance area are respectively divided into a plurality of small regions, the small regions being ranked in the order of the collision possibility of the object with the moving body, and
   wherein the selection unit selects the target object on the basis of the small region in which the object exists.

* * * * *